US009992240B2

(12) United States Patent
Campbell

(10) Patent No.: US 9,992,240 B2
(45) Date of Patent: Jun. 5, 2018

(54) PRESERVING S1-AP UE CONTEXTS ON SCTP FAILOVER

(71) Applicant: Telefonaktiebolaget L M Ericsson (publ), Stockholm (SE)

(72) Inventor: Loudon Lee Campbell, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 125 days.

(21) Appl. No.: 15/041,922

(22) Filed: Feb. 11, 2016

(65) Prior Publication Data
US 2016/0242084 A1    Aug. 18, 2016

Related U.S. Application Data

(60) Provisional application No. 62/115,909, filed on Feb. 13, 2015.

(51) Int. Cl.
*H04W 76/00* (2018.01)
*H04L 29/06* (2006.01)
(Continued)

(52) U.S. Cl.
CPC ...... *H04L 65/1069* (2013.01); *H04L 65/1083* (2013.01); *H04W 24/04* (2013.01); *H04W 8/06* (2013.01); *H04W 92/045* (2013.01)

(58) Field of Classification Search
CPC ........... H04L 65/1069; H04L 65/1083; H04W 24/04; H04W 8/06; H04W 92/045
See application file for complete search history.

(56) References Cited

U.S. PATENT DOCUMENTS 7,929,422 B2 * 4/2011 Ramalho ........... H04L 29/06027
370/219
8,215,939 B2 * 7/2012 Takagi ............... B29D 30/0606
425/195
(Continued)

OTHER PUBLICATIONS

PCT, Notification of Transmittal of the International Search Report and the Written Opinion of the International Searching Authority, or the Declaration, Int'l Appln No. PCT/IB2016/050757, dated May 31, 2016.
(Continued)

*Primary Examiner* — Brian D Nguyen
(74) *Attorney, Agent, or Firm* — Baker Botts, LLP

(57) ABSTRACT

According to some embodiments, a method in a network node of a wireless communication network comprises determining that a plurality of S1-AP UE contexts maintained by the network node remain valid after a SCTP failure; generating an S1 Setup Request message comprising an indication that the UE contexts remain valid; and communicating the S1 Setup Request message to a MME. In particular embodiments, a method in an MME comprises receiving an S1 Setup Request message from a network node comprising an indication that UE contexts maintained by the network node remain valid after a SCTP failure. The MME determines a plurality of UE contexts maintained by the MME remain valid after a SCTP failure; generates an S1 Setup Response message comprising an indication that UE contexts maintained by the MME remain valid; and communicates the S1 Setup Response message to the network node.

22 Claims, 6 Drawing Sheets

(51) Int. Cl.
*H04W 24/04* (2009.01)
*H04W 8/06* (2009.01)
*H04W 92/04* (2009.01)

(56) References Cited

U.S. PATENT DOCUMENTS

| | | | | |
|---|---|---|---|---|
| 8,477,811 | B2* | 7/2013 | Kitazoe | H04W 76/045 |
| | | | | 370/231 |
| 8,600,385 | B2* | 12/2013 | Yasuoka | H04W 92/20 |
| | | | | 370/331 |
| 8,908,603 | B2* | 12/2014 | Olsson | H04W 8/30 |
| | | | | 370/221 |
| 9,143,990 | B2* | 9/2015 | Chen | H04W 24/04 |
| 9,276,806 | B2* | 3/2016 | Cartmell | H04L 41/0668 |
| 9,549,423 | B2* | 1/2017 | Liu | H04W 76/021 |
| 9,686,317 | B2* | 6/2017 | Pancorbo Marcos | H04L 63/20 |
| 9,723,591 | B2* | 8/2017 | Rohit | H04W 72/04 |

OTHER PUBLICATIONS

Nortel, "Proposal for S1-MME SCTP Failure Handling," 3GPP TSG RAN WG2 #61bis, Apr. 31-4, 2008, R2-081288, 3GPP TSG-RAN WG3 #63, Feb. 9-13, 2009, R3-090396, XP050325155, whole document retrieved Feb. 5, 2009.

Campbell, Provisional Patent Application entitled "SCTP Failover While Retaining S1-AP UE Contexts," U.S. Appl. No. 62/115,909, filed Feb. 13, 2015.

\* cited by examiner

PRESERVING S1-AP UE CONTEXTS ON SCTP FAILOVER

TECHNICAL FIELD

Particular embodiments relate generally to signaling in wireless communications networks, and more particularly to preserving S1 Application Protocol (S1-AP) user equipment (UE) contexts on failover of a Stream Control Transmission Protocol (SCTP) endpoint.

RELATED APPLICATION

This application claims benefit under 35 U.S.C. § 119(e) to U.S. Provisional Application Ser. No. 62/115,909, entitled "SCTP FAILOVER WHILE RETAINING S1-AP UE CONTEXTS," filed Feb. 13, 2015, the entire content of which is incorporated herein by reference.

BACKGROUND

Third Generation Partnership Project (3GPP) defines the S1 interface for interconnecting the evolved NodeB (eNB, eNodeB) component of the evolved universal terrestrial radio access network (E-UTRAN) to the core network (CN) of the evolved packet system (EPS). The E-UTRAN architecture consists of a set of eNodeBs connected to the evolved packet core (EPC) through the S1 interface. The set of eNodeBs may include a Home eNodeB (HeNB) and a HeNB gateway (HeNB GW). For example, the S1-AP interface exists between the MME and the HeNB GW and the HeNB GW and the HeNB. Thus, the HeNB GW may perform the functionality of an MME or an eNodeB. As used herein, the term "eNodeB" may refer to an eNodeB or a HeNB GW, and the term "MME" may refer to an MME or a HeNB GW. The overall long term evolution (LTE) architecture and E-UTRAN architecture are described in 3GPP TS 36.401.

The S1 interface is specified at the boundary between the EPC and the E-UTRAN. From the S1 perspective, the E-UTRAN access point is an eNodeB, and the EPC access point is either the control plane mobility management entity (MME) logical node or the user plane serving-gateway (S-GW) logical node. The Stream Control Transmission Protocol (SCTP), specified in IETF RFC 4960, is used to support the exchange of S1 Application Protocol (S1-AP) signaling messages between an eNodeB and an MME.

One function of S1-AP is managing UE contexts (i.e., establishing and releasing UE contexts in the eNodeB and in the EPC to support user individual signaling on S1). The S1 UE context management function supports the establishment of the necessary overall initial UE context including E-UTRAN Radio Access Bearer (E-RAB) context, security context, roaming and access restrictions, etc. The establishment of the overall initial UE context is initiated by the MME. The S1 UE context management function also supports the release of the context previously established in the eNodeB. The release of the context may be triggered by the MME either directly or following a request received from the eNodeB.

The eNodeB generally downloads most of its UE context information from the MME. The SCTP protocol provides IP level communication between the MME and eNodeB nodes and it transports the S1-AP messages. SCTP is used for reliable, in sequence delivery of messaging between the two SCTP endpoints for the duration of the link association. According to 3GPP specifications, if the SCTP association is lost, then the eNodeB deletes all its UE contexts. The UEs perform Service Request procedures and download a UE context again from the MME in response to an S1-AP Setup message. This may, for example, result in audio disruption during a Voice over LTE call, or dropped video frames for a video stream.

Specifically, 3GPP TS 36.413 release 12 subclause 8.7.3.1 describes that the purpose of the S1 Setup procedure is to exchange application level data needed for the eNodeB and the MME to correctly interoperate on the S1 interface. Setup is the first S1-AP procedure triggered after the transport network layer (TNL) association becomes operational. It uses non-UE associated signaling. The setup procedure reinitializes the E-UTRAN S1-AP UE contexts (if any) and erases all related signaling connections in the two nodes like a Reset procedure would do, and clears MME overload state information at the eNodeB.

This behavior is appropriate when, for example, the eNodeB, MME, or HeNB GW experiences a failure in which it loses all SCTP and UE context information. In other situations, however, such as when one processor performs the SCTP functions and a different processor stores the UE context information, the behavior is inefficient. For example, a large eNodeB, large HeNB BW, or MME may have 150,000 connected users. Resetting all the connections generates release, setup, and/or modify request/responses for each connection. This could potentially add up to almost a million messages traversing the network as part of an eNodeB reset.

One alternative is to replicate the SCTP state and all non-acknowledged data between two different processors. At high signaling rates, however, such replication requires enormous processing power and a two-phase commit to replicate state data at both boards, which can be prohibitively expensive. Thus, in conventional systems, the SCTP state may be lost on most hardware faults associated with the SCTP process.

As another alternative, some equipment vendors provide proprietary implementations that assume that if an eNodeB does not send an S1 Setup message, then the eNodeB preserved its UE contexts. Such an implementation ignores the 3GPP requirement that the S1 Setup message be sent as the first message in a new SCTP connection. Another problem is that the MME may autonomously delete an SCTP association and related UE contexts because of an SCTP timeout at the MME, which results in stranded UE contexts on the eNodeB. This may also result in non-responsive S1-AP connections to an MME when the MME is waiting for an S1 Setup before providing full service to an eNodeB. Thus, such implementations are unreliable because the circumstances of an SCTP restart/setup may not be clear to each SCTP peer.

SUMMARY

According to some embodiments, method in a network node of a wireless communication network comprises determining that a plurality of S1 Application Protocol (S1-AP) user equipment (UE) contexts maintained by the network node remain valid after a Stream Control Transmission Protocol (SCTP) failure; generating an S1 Setup Request message comprising an indication that the plurality of UE contexts maintained by the network node remain valid; and communicating the S1 Setup Request message to a mobility management entity (MME). The MME is an SCTP peer of the network node.

In particular embodiments, the method further comprises receiving, from the MME, an S1 Setup Response message comprising an indication that a plurality of UE contexts maintained by the MME remain valid. The method may also comprise receiving, from the MME, an S1 Setup Response message comprising an indication that a plurality of UE contexts maintained by the MME are invalid, and reinitializing the plurality of UE contexts maintained by the network node.

In particular embodiments, the method further comprises determining that a UE context maintained by the network node is invalid after the SCTP failure; generating an S1 Reset message comprising an indication of the invalid S1-AP UE context; and communicating the S1 Reset message to the MME.

In particular embodiments, the indication that the plurality of UE contexts maintained by the network node remain valid comprises a hash value identifying the plurality of UE contexts, such as one or more Hypertext Transfer Protocol (HTTP) entity tags (ETags).

According to some embodiments, a method in a MME of a wireless communication network comprises receiving an S1 Setup Request message from a network node. The S1 Setup Request message comprises an indication that a plurality of S1-AP UE contexts maintained by the network node remain valid after a SCTP failure. The method further comprises determining whether a plurality of UE contexts maintained by the MME remain valid after a SCTP failure.

In particular embodiments, the method further comprises, upon determining the plurality of UE contexts maintained by the MME remain valid after the SCTP failure, generating an S1 Setup Response message comprising an indication that the plurality of UE contexts maintained by the MME remain valid; and communicating the S1 Setup Response message to the network node. The method may further comprise, upon determining the plurality of UE contexts maintained by the MME are invalid after the SCTP failure, generating an S1 Setup Response message comprising an indication that the plurality of UE contexts maintained by the MME are invalid; reinitializing the plurality of UE contexts maintained by the MME; and communicating the S1 Setup Response message to the network node.

In particular embodiments, the indication that the plurality of UE contexts maintained by the MME remain valid comprises a hash value identifying the plurality of UE contexts, such as one or more HTTP ETags.

According to some embodiments, a network node comprises a detect lining module, a message generating module, and a communicating module. The determining module is operable to determine that a plurality of S1-AP UE contexts maintained by the network node remain valid after a SCTP failure. The generating module is operable to generate an S1 Setup Request message comprising an indication that the plurality of UE contexts maintained by the network node remain valid. The communicating module is operable to communicate the S1 Setup Request message to a MME. The MME is an SCTP peer of the network node.

According to some embodiments, a MME comprises a communicating module and a determining module. The communicating module is operable to receive an S1 Setup Request message from a network node. The S1 Setup Request message comprises an indication that a plurality of S1-AP UE contexts maintained by the network node remain valid after a SCTP failure. The determining module is operable to determine whether a plurality of UE contexts maintained by the MME remain valid after a SCTP failure.

Also disclosed is a computer program product. The computer program product comprises instructions stored on non-transient computer-readable media which, when executed by a processor, perform the acts of determining that a plurality of S1-AP UE contexts maintained by the network node remain valid after a SCTP failure; generating an S1 Setup Request message comprising an indication that the plurality of UE contexts maintained by the network node remain valid; and communicating the S1 Setup Request message to a MME. The MME is an SCTP peer of the network node.

Another computer program product comprises instructions stored on non-transient computer-readable media which, when executed by a processor, perform the acts of receiving an S1 Setup Request message from a network node. The S1 Setup Request message comprises an indication that a plurality of S1-AP UE contexts maintained by the network node remain valid after a SCTP failure. The instructions, when executed, also perform the act of determining whether a plurality of UE contexts maintained by the MME remain valid after a SCTP failure.

Particular embodiments may exhibit some of the following technical advantages. In an S1 architecture where a first module performs SCTP processing and a second module stores S1-AP information, such as UE context information, a failure or restart of the SCTP module may not adversely impact UEs connected to the eNodeB and MME. For example, a particular advantage is that SCTP failures may not interrupt audio, video, etc. connections for a UE connected to the MME (assuming other required resources, such as radio transmitter, etc., are not impacted by the SCTP module failure). Another advantage is more efficient use of network resources. For example, depending on the number of connected UEs, resetting all S1 connections for an eNodeB may generate a large number of signaling messages. Thus, preventing an unnecessary reset of all UE-associated logical S1 connections on an eNodeB may prevent unnecessary signaling messages, which conserves network resources.

Another advantage is that particular embodiments are backward compatible with previous 3GPP implementations because a new optional information element may simply be ignored by previous implementations. For example, if either eNodeB or MME does not support the new information element, both sides may perform as a conventional system and reset the UE contexts.

In particular embodiments, if either the eNodeB or the MME has deleted its SCTP associations and related UE contexts (e.g., based on a timeout, etc.), then the node may simply not include the new information element in the Setup Request or Response message, causing the SCTP peer to also reset its UE contexts. Thus, preventing stranded UE contexts is another advantage of particular embodiments.

As another advantage, in particular embodiments a first eNodeB may take over for a second eNodeB if the first eNodeB has the UE context information of the second eNodeB. For example, two Home eNodeB gateways may share UE context information. Upon failure of one gateway, the other gateway may take over all the UE connections of the failed gateway. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
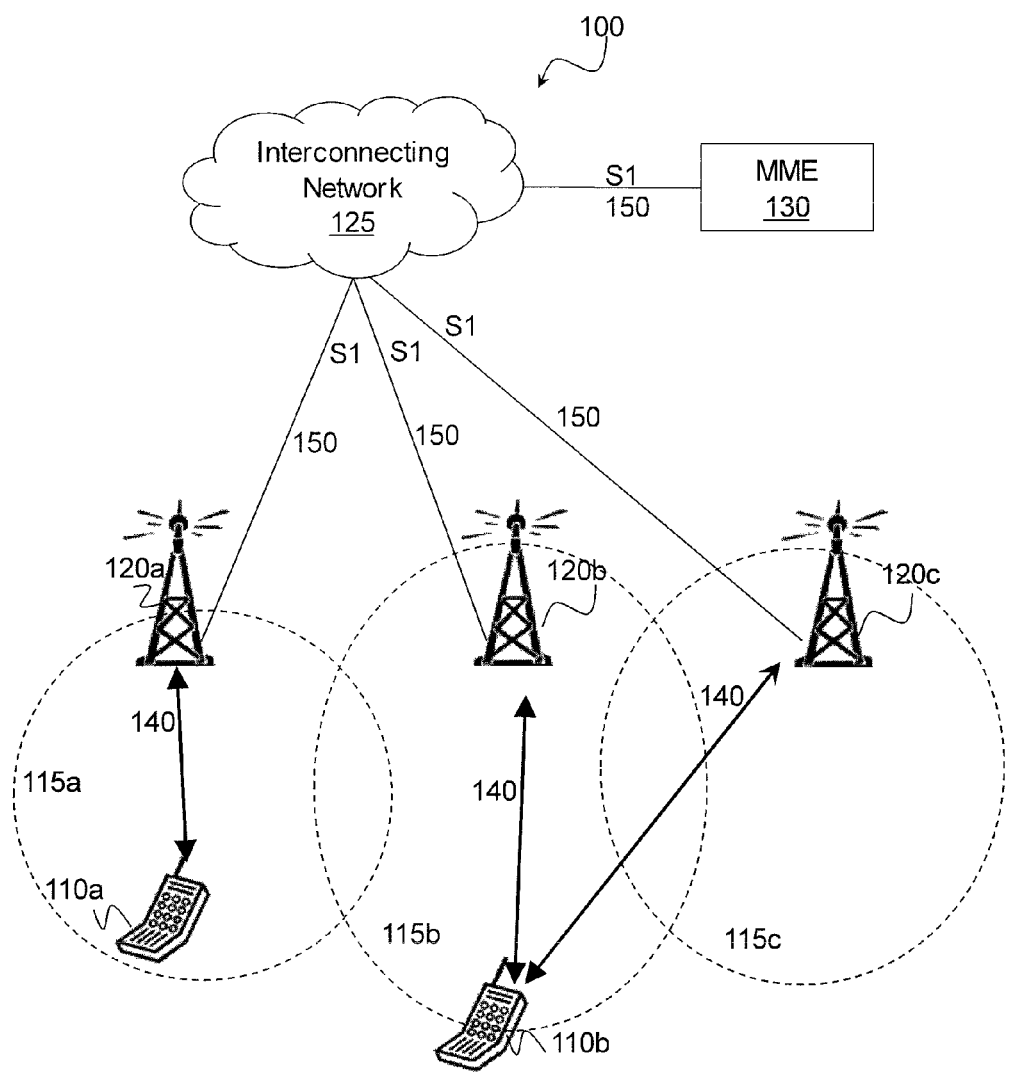
FIG. 1 is a block diagram illustrating an example wireless network, according to a particular embodiment.

Resetting all S1 connections after failure of a network node's SCTP module may interrupt user traffic, and may adversely impact network signaling traffic because of the large amount of signaling information exchanged to re-establish the S1 connections. An object of the present disclosure is to obviate at least these disadvantages by providing efficient recovery from an SCTP module failure and minimize interruption of user traffic. Network nodes that separate their SCTP module from their UE context storage may benefit from particular embodiments.

For example, embodiments described herein are directed to methods and systems configured to replace or modify the S1 Setup procedure in 3GPP to include a flag that indicates UE contexts are preserved after a failure (i.e., only the SCTP module has failed/restarted and the S1-AP UE context information is retained). Particular embodiments include a flag to indicate a network node was able to preserve its UE contexts after a failure.

For example, a particular embodiment includes an S1-AP Setup Request message with an optional information element (IE) indicating that the UE contexts were preserved at the eNodeB. An S1-AP Setup Response message includes an optional IE indicating the UE contexts were preserved at the MME. If the MME receives a Setup Request from the eNodeB including the new IE, and the MME has also retained its UE contexts, then the MME includes the new IE in the S1 Setup Response message sent back to the eNodeB. The new information element (i.e., flag) indicates to both nodes that most UE contexts have been saved. Both nodes may continue without deleting and re-establishing all their UE contexts. If either side excludes this new IE, then both sides may assume most UE contexts have been lost and perform conventional S1 Setup behavior.

During an SCTP failure, some SCTP data chunks may not get delivered which could result in a few UEs in a state that does not match their UE context. In particular embodiments, these mismatched UE contexts are identified and the network node will send an S1 Reset message for the mismatched UEs.

In particular embodiments, the new IE comprises a single bit in the S1-AP message. The single bit may comprise a Boolean flag that indicates whether the UE contexts are preserved. In some embodiments, the new IE comprises multiple hits which can be used to provide more information than just the Boolean value. For example, multiple bits may represent a hash value used to compare whether the UE contexts are the same on each network node.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-7B of the drawings, like numerals being used for like and corresponding parts of the various drawings. LTE is used throughout this disclosure as an example cellular system, but the ideas presented herein may apply to other wireless communication systems as well.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of radio network nodes. Wireless device 110 may also be referred to as a UE. The network nodes include network nodes 120 (such as base stations or eNodeBs), and a core network node 130 (such as an MME). Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 140. For example, wireless devices 110 and radio network node 120 may communicate wireless signals 140 containing voice traffic, data traffic, and/or control signals. A network node 120 communicating voice traffic, data traffic, and/or control signals to wireless device 110 may be referred to as a serving network node 120 for the wireless device 110. Wireless signals 140 may include both downlink transmissions (from radio network node 120 to wireless devices 110) and uplink transmissions (from wireless devices 110 to radio network node 120).

Each network node 120 may have a single transmitter or multiple transmitters for transmitting signals 140 to wireless devices 110. In some embodiments, network node 120 may comprise a multi-input multi-output (MIMO) system. Similarly, each wireless device 110 may have a single receiver or multiple receivers for receiving signals 140 from network nodes 120.

Core network node 130 manages the establishment of communication sessions and various other functionality for wireless communication devices 110 within coverage (or partial coverage) of the wireless network. The network nodes connect through interconnecting network 125, which refers to any interconnecting system capable of transmitting audio, video, signals, data, messages, or any combination of the preceding.

In particular embodiments, core network node 130 comprises MME 130. S1 interfaces 150 connect MME 130 to network nodes 120. The S1-AP provides signaling between network node 120 and MME 130 over S1 interface 150. S1-AP uses SCTP to transport S1-AP signaling messages between network node 120 and MME 130.

One function of S1-AP is managing UE contexts (i.e., establishing and releasing UE contexts for wireless devices 110 in network node 120 and in MME 130 to support user individual signaling on S1). The establishment of the initial UE context is initiated by MME 130. The S1 UE context management function also supports the release of the context previously established in network node 120. The release of the context may be triggered by MME 130 either directly or following a request received from network node 120. Network node 120 generally downloads most of its UE context information from MME 130. In particular embodiments, a UE context refers to any S1 information associated with a particular UE. A particular example of a UE context is described in 3GPP TS 36.413.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a network node may include any suitable combination of hardware and/or software. For example, in particular embodiments, a network node, such as network node 120, may include the components described with respect to FIG. 6A below. As another example, in particular embodiments a core network node, such as MME 130, may include the components described with respect to FIG. 7A below.

Figure 2:
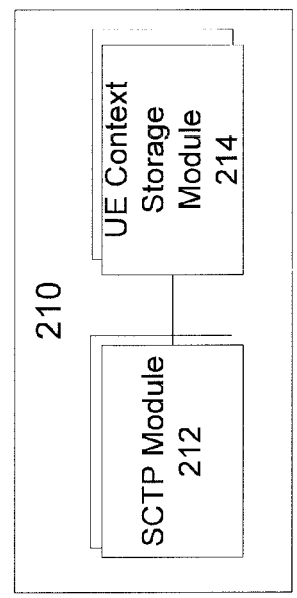
FIG. 2 is a block diagram illustrating an example SCTP network node, according to particular embodiment.

FIG. 2 is a block diagram illustrating an example SCTP network node, according to particular embodiment. SCTP network node 210 may comprise any of the network nodes described with respect to FIG. 1, such as network node 120 and MME 130. SCTP network node 210 includes SCTP module 212 and UE context storage module 214.

SCTP module 212 includes any suitable combination of hardware and software for providing SCTP functionality for SCTP network node 210. In particular embodiments, SCTP module 212 may comprise only software. In particular embodiments, SCTP module 212 may comprise multiple SCTP modules 212 that provide redundancy for each other. For example, failure of one SCTP module 212 may result in another SCTP module 212 taking over and providing SCTP functionality for SCTP network node 210.

UE context storage module 214 includes any suitable combination of hardware and software for storing UE contexts for SCTP network node 210. In particular embodiments, UE context storage module 214 may comprise only software. In particular embodiments, UE context storage module 214 may comprise multiple UE context storage modules 214 that provide redundancy for each other. For example, failure of one UE context storage module 214 may result in another UE context storage module 214 taking over and providing UE context storage functionality for SCTP network node 210.

In particular embodiments, SCTP module 212 is in communication with UE context storage module 214. SCTP module 212 may communicate UE context information to UE context storage module 214, and vice versa. Communication between SCTP module 212 and UE context storage module 214 may comprise any suitable inter-process, inter-task, inter-thread, etc. communication.

In particular embodiments, UE context storage module 214 and SCTP module 212 may comprise separate processors, boards, cards, controllers, etc. In particular embodiments, UE context storage module 214 and SCTP module 212 may comprise the same processor, board, card, controller, etc.

Under particular operating conditions, SCTP module 212 may fail or restart without adversely impacting UE context storage module 214. For example, SCTP module 212 may comprise a separate processor than UE context storage module 214. Failure or restart of the SCTP module 212 processor will not adversely impact UE context storage module 214 because UE context storage module 214 comprises a processor independent from SCTP module 212. In other embodiments, SCTP module 212 and UE context storage module 214 may comprise software processes on the same processor. SCTP module 212 may fail and restart (e.g., failure of SCTP software stack, network failure, etc.) without adversely impacting UE context storage module 214. Thus, under particular circumstances UE context storage module 214 may preserve UE context information for use by SCTP module 212 after a failure and restart.

In particular embodiments, SCTP module 212 of network node 120 may fail without adversely impacting S1-AP information, such as UE context information stored by UE context storage module 214. Thus, instead of reinitializing all UE contexts upon restart of SCTP module 212, network node 120 may use the preserved UE context information when SCTP module 212 restarts.

In particular embodiments, network node 120 may include a flag in the Setup Request Message that indicates UE contexts are preserved after a failure. Similarly, MME 130 may include a flag in the Setup Response message that indicates UE contexts are preserved after a failure.

In particular embodiments, an SCTP failure may refer to any event that results in the restart or reinitialization of the SCTP protocol stack. For example, failures may include hardware failures, software failures, network failures, or any event that disrupts normal SCTP operation.

Figure 3A:
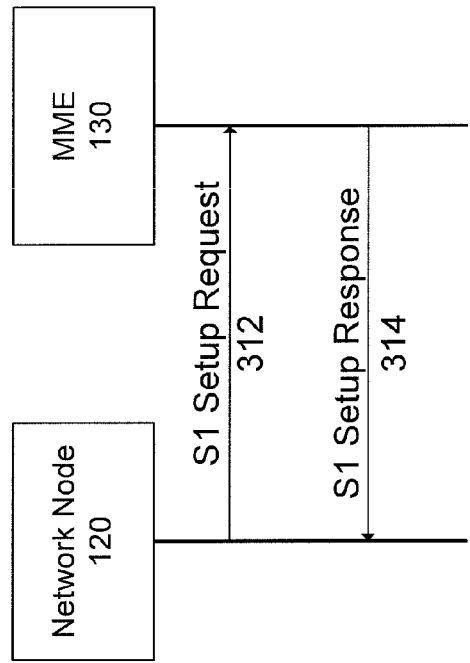
FIG. 3A is an example signaling diagram for SCTP setup between a network node and an MME, according to particular embodiments.

FIG. 3A is an example signaling diagram for SCTP setup between a network node and an MME, according to particular embodiments. In particular embodiments, one or more steps of the signaling diagram may be performed by components of wireless network 100 described with reference to FIGS. 1 and 2. For example, FIG. 3A illustrates an example SCTP setup between network node 120a and MME 130.

Setup is the first S1-AP procedure triggered after the TNL association becomes operational. At 312, network node 120a sends a S1 Setup Request message to MME 130. The S1 Setup Request message transfers information for a TNL session to MME 130. In particular embodiments, network node 120a may determine it can use a plurality of its existing UE contexts. Network node 120a may include a flag in the S1 Setup Request message indicating that network node 120a does not need to delete its existing UE contexts.

MME 130 receives the S1 Setup Request message. If MME 130 is unable to detect the flag or if the flag is not present, then MME 130 may delete its UE contexts. If MME 130 detects the flag is present, then MME 130 may determine whether it can use any of its existing UE contexts.

At 314, MME 130 sends a S1 Setup Response message to network node 120a. The S1 Setup Response message transfers information for a TNL session to network node 120a. In particular embodiments, MME 130 may include a flag in the S1 Setup Response message indicating that MME 130 will not delete its existing UE contexts.

Figure 3C:
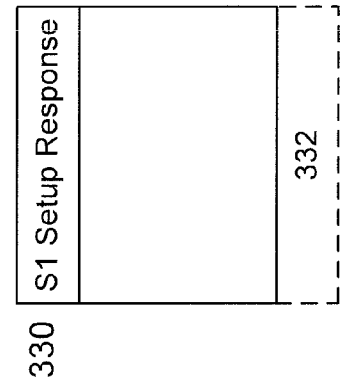
FIG. 3C illustrates an example S1 Setup Response message, according to particular embodiments.
Figure 3B:
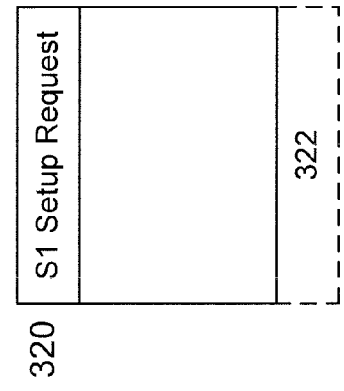
FIG. 3B illustrates an example S1 Setup Request message, according to particular embodiments.

FIG. 3B illustrates an example S1 Setup Request message, according to particular embodiments. S1 Setup Request message 320 may include optional information element 322.

Information element 322 is an optional information element that indicates a network node, such as network node 120, can use its existing UE context information. For example, information element 322 may indicate that a plurality of UE contexts maintained by network node 120 remain valid after an SCTP failure. In particular embodiments, information element 322 comprises a single bit. The single bit may comprise a Boolean flag representing whether the network node can use its existing UE context information. For example, if network node 120 determines that after a restart of its SCTP protocol stack network node 120 can use a plurality of its existing UE contexts, then network node 120 may include information element 322 in S1 Setup Request message 320. In other embodiments, information element 322 may comprise any number of bits.

For example, in particular embodiments information element 322 may include a number of bits for security purposes. Information element 322 may serve as both a flag indicating that network node 120 may use its existing UE contexts as well as a way to verify the identity of network node 120. An advantage of such an embodiment is that it may provide security against an SCTP peer hijacking other nodes UE contexts, either intentionally or unintentionally.

In particular embodiments, information element 322 may include a hash value representing the contents of the network node's UE contexts. For example, in particular embodiments information element 322 may simply include a version number. In other embodiments information element 322 may include the result of a hash function applied to all the UE contexts of the network node. In particular embodiments, information element 322 may include one or more HTTP ETags. Including two information elements 322 may facilitate graceful handling of particular race conditions by including an old hash value (such as an old ETag) and a new hash value (such as a new ETag).

A particular advantage is that the described embodiments may be used when the IP addresses of the new SCTP association are different than the old IP addresses. For example, an S1-AP proxy, such as a Home eNodeB Gateway, may take over the UE connection of another Home eNodeB Gateway.

FIG. 3C illustrates an example S1 Setup Response message, according to particular embodiments. S1 Setup Response message 330 may include optional information element 332.

Information element 332 is an optional information element that indicates a network node, such as MME 130, can use its existing UE context information. For example, information element 332 may indicate that a plurality of UE contexts maintained by MME 130 remain valid after an SCTP failure. In particular embodiments, information element 332 comprises a single bit. As described above with respect to information element 322 in FIG. 3B, information element 332 may comprise a single bit or any number of bits, including version numbers, hash values, ETags, etc. Information element 332 represents whether an MME can use its existing UE context information. For example, if MME 130 determines that after a restart of its SCTP protocol stack MME 130 can use a plurality of its existing UE contexts, then MME 130 may include information element 332 in S1 Setup Response message 330.

Figure 4:
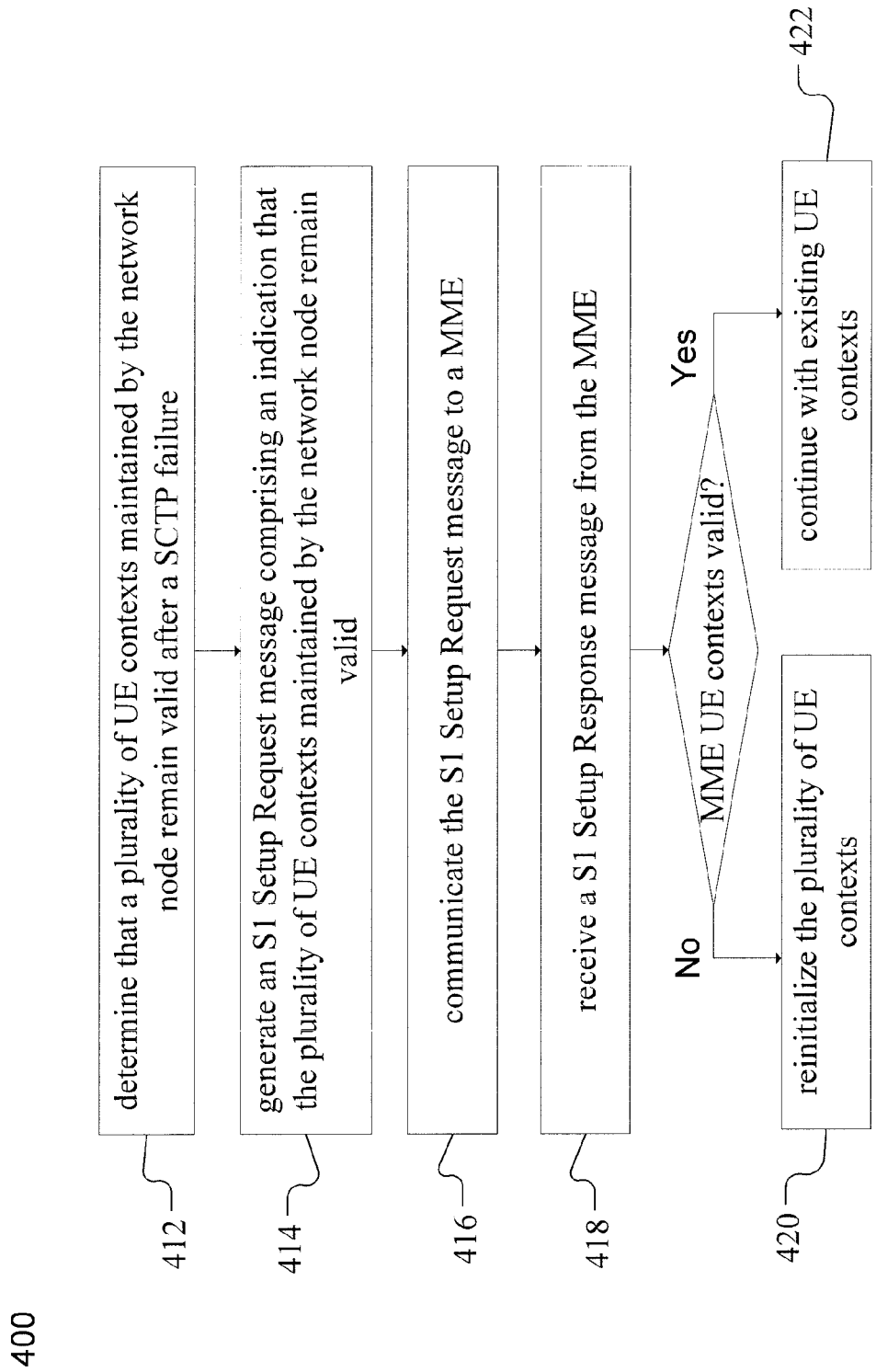
FIG. 4 is a flow diagram of a method in a network node of preserving S1-AP contexts on SCTP failover, according to particular embodiments.

FIG. 4 is a flow diagram of a method in a network node of preserving S1-AP contexts on SCTP failover, according to particular embodiments. In particular embodiments, one or more steps of method 400 may be performed by components of wireless network 100 described with reference to FIGS. 1-7B.

The method begins at step 412, where a network node determines that a plurality of UE contexts maintained by the network node remain valid after a SCTP failure. For example, network node 120 may determine that its SCTP module experienced a failure and restarted. As part of the restart, network node 120 may determine that it includes a number of UE contexts for UE connections that existed before the SCTP failure. Network node 120 may determine that a large number of the UE contexts are still valid and usable. According to particular embodiments, not all UE contexts need be valid. Advantages of the described embodiments may still be realized even if some UE contexts are later reset.

At step 414, the network node generates an S1 Setup Request message comprising an indication that the plurality of UE contexts maintained by the network node remain valid. For example, network node 120a may generate S1 Setup Request message 320 including information element 322.

In particular embodiments, generating the S1 Setup Request message may include performing a hash function, or some other validation function, on the UE contexts of network node 120, or generating an identifier of network node 120, as part of generating information element 322.

At step 416, the network node communicates the S1 Setup Request message to a MME. For example, network node 120a may communicate S1 Setup Request message 320 (including information element 322) to MME 130.

At step 418, the network node receives a S1 Setup Response message from the MME. For example, network node 120a may receive S1 Setup Response message 330 from MME 130.

In particular embodiments, the network node determines whether the MME includes valid and usable UE contexts. For example, network node 120a may inspect S1 Setup Response message 330 for information element 332.

In particular embodiments, if information element 332 is not present, if information element 332 indicates MME 130 does not have valid UE contexts, if information element 332 indicates MME 130 has valid UE contexts but the UE contexts do not match the UE contexts of network node 120*a*, or if any other suitable criteria is not satisfied, then network node 120*a* may continue to step 420 an reinitialize its UE contexts according to conventional S1 Setup procedure.

In particular embodiments, if information element 332 is present and indicates that MME 130 has valid UE contexts, then network node 120*a* may continue to step 422 where network node 120*a* continues its S1 Setup procedure using its existing UE contexts.

In particular embodiments, network node 120*a* may compare received information element 332 with sent information element 322. For example, information element 322 may contain an ETag representing the UE contexts of network node 120*a*. Information element 332 may contain an ETag representing the UE contexts of MME 130. Network node 120*a* may compare the two ETags to verify the information stored at MME 130 matches the information stored at network node 120*a*. In particular embodiments, network nodes may include two ETags in the Setup messages. For example, one ETag may represent the UE context information before a failure event and one may represent the UE context information after the failure event.

In particular embodiments, network node 120*a* may transmit identification, validation, or authentication information in information element 322. Network node 120*a* may receive identification, validation, or authentication information in information element 332. Network node 120*a* may use any suitable information from information element 332 to determine whether to continue to either step 420 or 422.

In some circumstances, a small number of UE contexts may be invalid after an SCTP failure. For example, during the time of the SCTP failure the protocol may have been unstable resulting in some failed connections (e.g., some SCTP data chunks may have been lost, resulting in a state mismatch). In these circumstances, some embodiments transition these UEs into an EPS connection management (ECM) idle state at both the MME and the network node.

Particular embodiments may determine which connections need to be reset by tracking any UE contexts that are incompletely deactivated in the past M seconds (e.g., S1 context release without an answer). Particular embodiments may use the list to send an S1-AP Reset message with the associated UE context after the Setup procedure. UE contexts may be identified by 32 bit IDs (MME UE S1-AP ID IE and eNB UE S1-AP ID IE), and the S1-AP Reset message may include multiple IDs in each message, resulting in an efficient reset of the few unusable connections.

Modifications, additions, or omissions may be made to method 400. Additionally, one or more steps in method 400 of FIG. 4 may be performed in parallel or in any suitable order.

Figure 5:
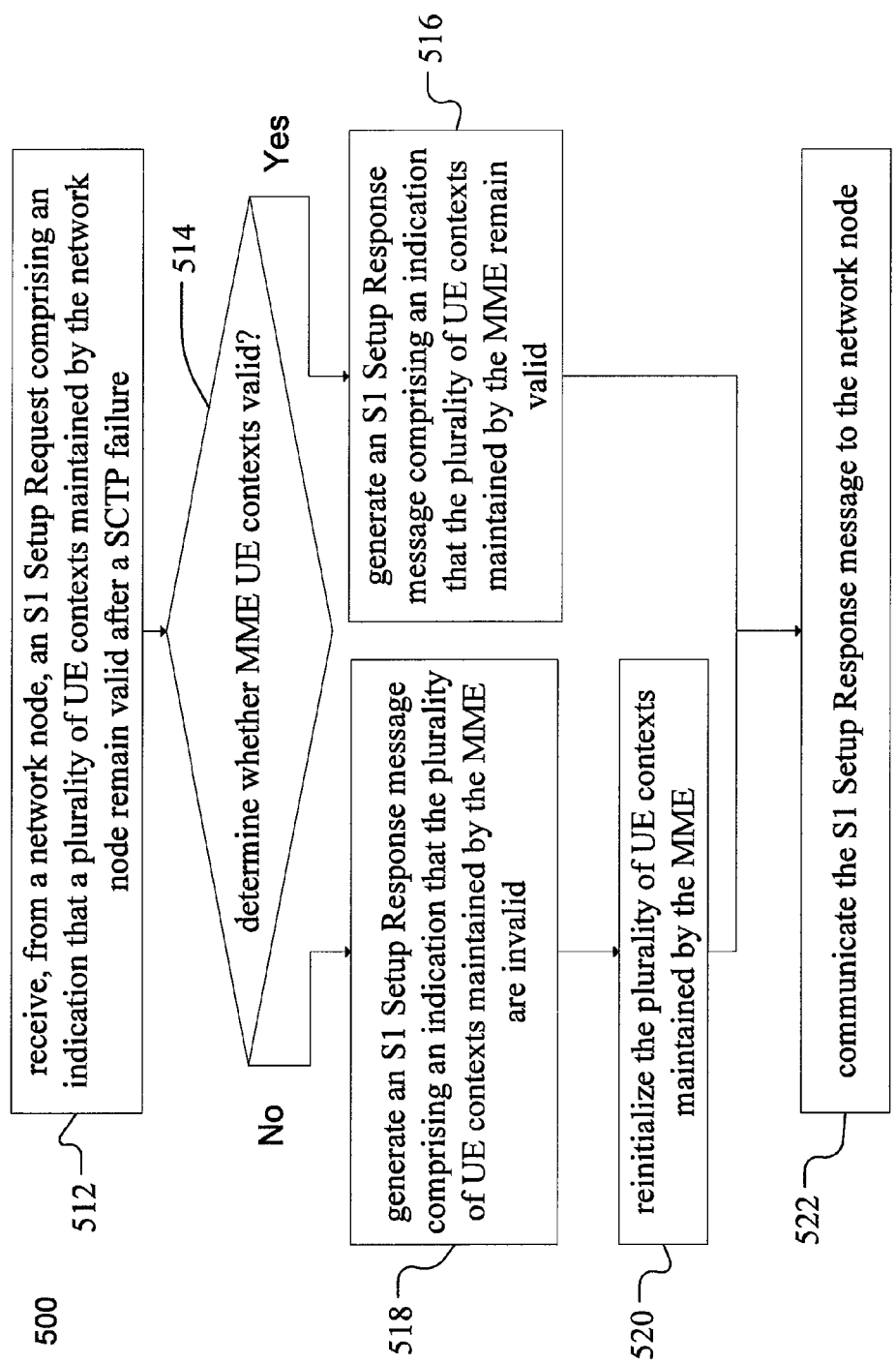
FIG. 5 is a flow diagram of a method in an MME of preserving S1-AP contexts on SCTP failover, according to particular embodiments.

FIG. 5 is a flow diagram of a method in an MME of preserving S1-AP contexts on SCTP failover, according to particular embodiments. In particular embodiments, one or more steps of method 500 may be performed by components of wireless network 100 described with reference to FIGS. 1-7B.

The method begins at step 512, where a MME receives an S1 Setup Request comprising an indication that a plurality of UE contexts maintained by the network node remain valid after a SCTP failure. For example, MME 130 may receive S1 Setup Request message 320 including information element 322 from network node 120*a*, such as the message sent by network node 120*a* described with respect to step 416 of FIG. 4.

At step 514, the MME determines whether its UE contexts are valid. For example, MME 130 may determine that its SCTP module experienced a failure and restarted. As part of the restart, MME 130 may determine that it includes a number of UE contexts for UE connections that existed before the SCTP failure. MME 130 may determine that a large number of the UE contexts are still valid and usable. According to particular embodiments, not all UE contexts need be valid.

In particular embodiments, MME 130 may not be aware of an SCTP failure. For example, in response to receiving information element 322, MME 130 may simply verify whether it has any valid UE contexts.

In particular embodiments, MME 130 may confirm identification, validation, or authentication information included in information element 322. For example, MME 130 may compare an ETag received in information element 322 with an ETag generated based on the UE contexts of MME 130.

If the MME determines its UE contexts are valid, and optionally verifies any information received from the network node, then the MME may continue to step 516 where it generates an S1 Setup Response message comprising an indication that a plurality of the UE contexts maintained at the MME remain valid. For example, MME 130 may generate S1 Setup Response message 330 including information element 332.

In particular embodiments, generating the S1 Setup Response message may include performing a hash function, or some other validation function, on the UE contexts of MME 130, or generating an identifier of MME 130, as part of generating information element 332.

If the MME does not recognize the information element in the S1 Setup Request message, does not validate the information element in the S1 Setup Request message, does not have a plurality of valid UE contexts, or does not satisfy any other suitable criteria, then the MME may continue to step 518 where it generates an S1 Setup Response message comprising an indication that a plurality of the UE contexts maintained at the MME are not valid. For example, MME 130 may generate S1 Setup Response message 330 including information element 332 indicating the UE contexts are not valid. In other embodiments, MME 130 may generate S1 Setup Response message 330 that does not include information element 332. The absence of information element 332 may indicate that the UE contexts for the MME are not valid.

At step 520, the MME reinitializes its UE contexts. For example, MME 130 may reinitialize its UE contexts.

At step 522, the MME communicates the S1 Setup Response message to the network node. For example, MME 130 may communicate S1 Setup Response message 330 to network node 120*a*.

Modifications, additions, or omissions may be made to method 500. Additionally, one or more steps in method 500 of FIG. 5 may be performed in parallel or in any suitable order.

A particular advantage of the embodiments described above are that they provide backwards compatibility with previous 3GPP network equipment because the new, optional information element may be ignored if it is not supported (e.g., if either node does not support certain features, all UE contexts may be deleted according to conventional S1 Setup behavior). For supported nodes, excluding the information element for either side also solves the problem described above where the either the MME or eNodeB has deleted all its UE contexts because of an SCTP link failure being detected before the SCTP link has been reestablished.

In other embodiments, an eNodeB that restarts SCTP may send an S1-AP Configuration Update message to indicate that the eNodeB preserved its UE contexts. If the MME accepts the configuration update, then the MME accepts the UE context. Similarly, an MME that restarts SCTP may send an S1-AP Configuration Update message to indicate it preserved its UE contexts. Particular embodiments may define a new message, such as UE Context Preserved, to signal the same information.

Figure 6A:
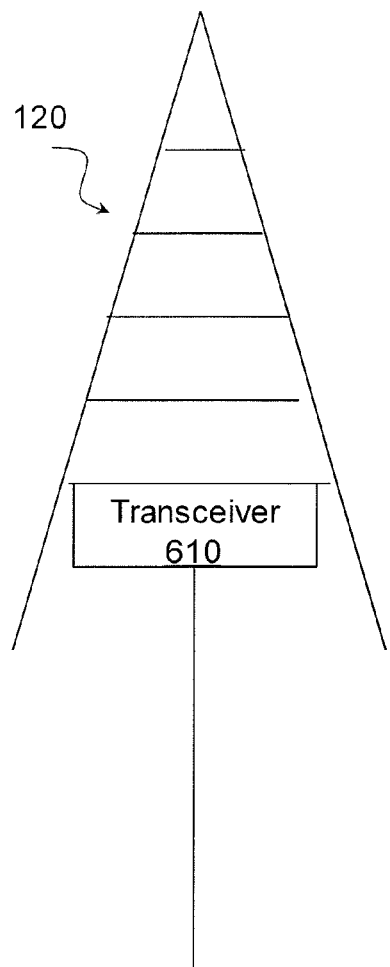
FIG. 6A is a block diagram illustrating an example embodiment of a network node.

FIG. 6A is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 610, at least one processor 620, at least one memory 630, and at least one network interface 640. Transceiver 610 facilitates transmitting wireless signals to and receiving wireless signals from a wireless device, such as wireless devices 110 (e.g., via an antenna); processor 620 executes instructions to provide some or all of the functionality described above as being provided by a network node 120; memory 630 stores the instructions executed by processor 620; and network interface 640 communicates signals to backend network components, such as a gateway, switch, router, Internet, Public Switched Telephone Network (PSTN), controller, and/or other network nodes 120.

Processor 620 includes any suitable combination of hardware and software implemented in one or more integrated circuits or modules to execute instructions and manipulate data to perform some or all of the described functions of the network node. In some embodiments, processor 620 may include, for example, one or more computers, one more programmable logic devices, one or more central processing units (CPUs), one or more microprocessors, one or more applications, and/or other logic, and/or any suitable combination of the preceding. Processor 620 may include analog and/or digital circuitry configured to perform some or all of the described functions of network node 120. For example, processor 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and refers to any suitable device operable to receive input for network node 120, send output from network node 120, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network.

In particular embodiments, processor 620 in communication with network interface 640 determines whether a network node's S1 UE contexts remain valid after an SCTP failure and/or restart, generates S1 messages, such as S1 Setup Request message 320, and communicates S1 messages with MME 130, such as S1 Setup Request message 320 and S1 Setup Response message 330.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 6B:
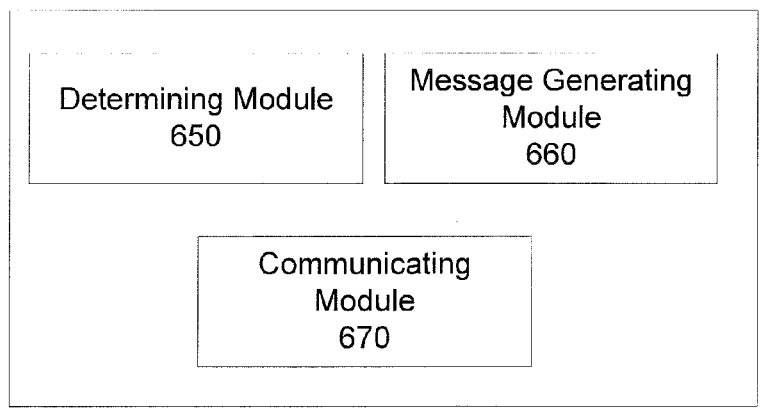
FIG. 6B is a block diagram illustrating example of components of a network node.

FIG. 6B is a block diagram illustrating example components of a network node 120. The components may include a determining module 650, a message generating module 660, and communicating module 670.

Determining module 650 may perform the processing functions of network node 120 related to determining whether S1 UE contexts are valid after an SCTP failure. In certain embodiments, determining module 650 may include or be included in processor 620. Determining module 650 may include analog and/or digital circuitry configured to perform any of the functions of determining module 650 and/or processor 620. In particular embodiments, determining module 650 may communicate with message generating module 660 and communicating module 670.

Message generating module 660 may perform the message generating functions of network node 120 related to generating S1 Setup messages and their information elements, such as S1 Setup Request message 320 and information element 322. In certain embodiments, message generating module 660 may include or be included in processor 620. Message generating module 660 may include analog and/or digital circuitry configured to perform any of the functions of message generating module 660 and/or processor 620. In particular embodiments, message generating module 660 may communicate with determining module 650 and communicating module 670.

Communicating module 670 may perform the communicating functions of network node 120 related to communicating S1 messages with MME 130. In particular embodiments, communicating module 670 may communicate, to MME 130, S1 Setup Request message 320 including information element 322. In certain embodiments, communicating module 670 may include or be included in processor 620. Communicating module 670 may include analog and/or digital circuitry configured to perform any of the functions of communicating module 670 and/or processor 620. In particular embodiments, communicating module 670 may also communicate with determining module 650 and message generating module 660.

Figure 7A:
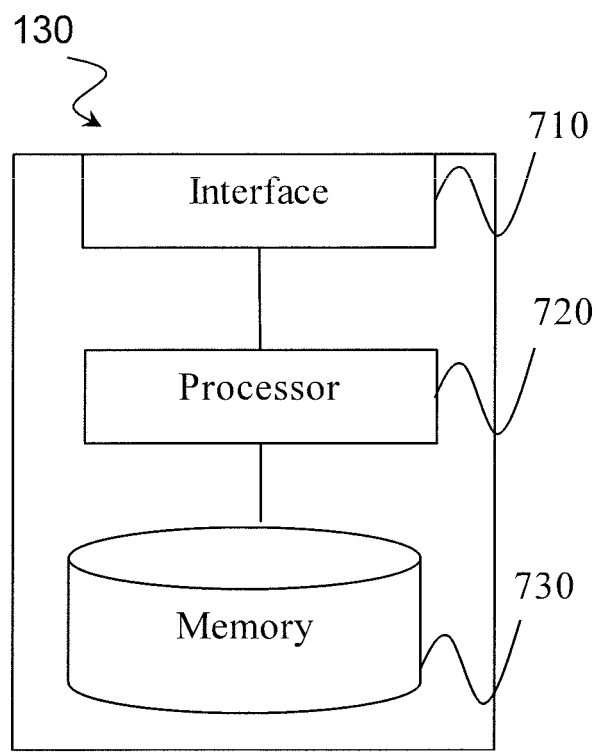
FIG. 7A is a block diagram illustrating an example embodiment of an MME.

FIG. 7A is a block diagram illustrating an example embodiment of an MME. MME 130 includes processor 720, memory 730, and network interface 710. In some embodiments, processor 720 executes instructions to provide some or all of the functionality described above as being provided by the MME, memory 730 stores the instructions executed by processor 720, and network interface 710 communicates signals to any suitable node, such as a gateway, switch, router, Internet, Public Switched Telephone Network (PSTN), network nodes 120, other MME 130, etc.

Processor 720 may include any suitable combination of hardware and software implemented in one or more modules to execute instructions and manipulate data to perform some or all of the described functions of the MME 130. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 710 is communicatively coupled to processor 720 and may refer to any suitable device operable to receive input for the MME, send output from the MME, perform suitable processing of the input or output or both, communicate to other devices, or any combination of the preceding. Network interface 710 may include appropriate hardware (e.g., port, modem, network interface card, etc.) and software, including protocol conversion and data processing capabilities, to communicate through a network.

In particular embodiments, processor 720 in communication with network interface 710 determines whether an MME's S1 UE contexts remain valid after an SCTP failure and/or restart, generates S1 messages, such as S1 Setup Response message 330, and communicates S1 messages with network node 120, such as S1 Setup Request message 320 and S1 Setup Response message 330.

Other embodiments of the network node may include additional components beyond those shown in FIG. 7A that may be responsible for providing certain aspects of the MME's functionality, including any of the functionality described above and/or any additional functionality (including any functionality necessary to support the solution described above).

Figure 7B:
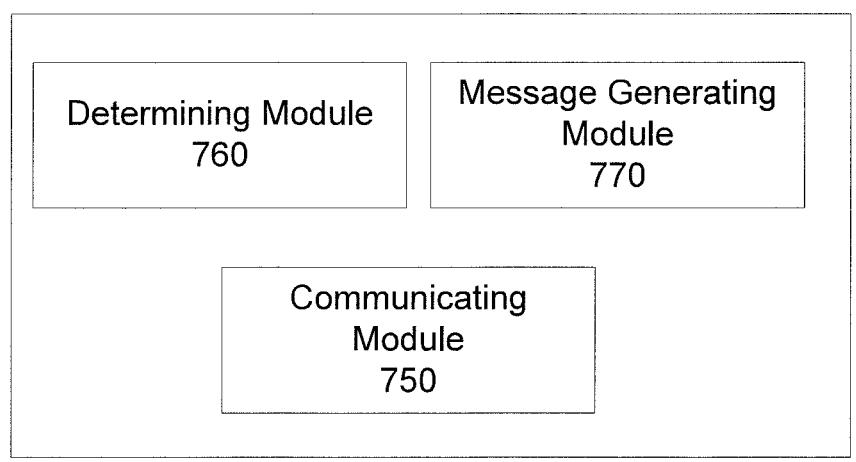
FIG. 7B is a block diagram illustrating example of components of an MME.

FIG. 7B is a block diagram illustrating example of components of an MME. The components may include a determining module 760, a message generating module 770, and communicating module 760.

Determining module 760 may perform the processing functions of MME 130 related to determining whether S1 UE contexts are valid after an SCTP failure. In certain embodiments, determining module 760 may include or be included in processor 720. Determining module 760 may include analog and/or digital circuitry configured to perform any of the functions of determining module 760 and/or processor 720. In particular embodiments, determining module 760 may communicate with message generating module 770 and communicating module 750.

Message generating module 770 may perform the message generating functions of MME 130 related to generating S1 Setup messages and their information elements, such as S1 Setup Response message 330 and information element 332. In certain embodiments, message generating module 770 may include or be included in processor 720. Message generating module 770 may include analog and/or digital circuitry configured to perform any of the functions of message generating module 770 and/or processor 720. In particular embodiments, message generating module 770 may communicate with determining module 760 and communicating module 750.

Communicating module 750 may perform the communicating functions of network MME 130 related to communicating S1 messages with network node 120. In particular embodiments, communicating module 750 may communicate, to network node 120, S1 Setup Response message 330 including information element 332. In certain embodiments, communicating module 750 may include or be included in processor 720. Communicating module 750 may include analog and/or digital circuitry configured to perform any of the functions of communicating module 750 and/or processor 720. In particular embodiments, communicating module 750 may also communicate with determining module 760 and message generating module 770.

Some embodiments of the disclosure may provide one or more technical advantages. As an example, in some embodiments a failure or restart of a network node's SCTP module may not impact UEs connected to the eNodeB and MME. For example, a particular advantage is that SCTP failures may not interrupt audio, video, etc. connections for a UE connected to the MME (assuming other required resources, such as radio transmitter, etc., are not impacted by the SCTP module failure). Another advantage is more efficient use of network resources. For example, resetting all S1 connections for an eNodeB may generate a large number of signaling messages. Preventing an unnecessary reset of all UE-associated logical S1 connections on an eNodeB may prevent unnecessary signaling messages, thus conserving network resources.

As another advantage, in particular embodiments a first eNodeB may take over for a second eNodeB if the first eNodeB has the UE context information of the second eNodeB. For example, two Home eNodeB gateways may share UE context information. Upon failure of one gateway, the other gateway may take over all the UE connections of the failed gateway.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station CN Core Network
D2D Device-to-Device
ECM EPS Connection Management
eNB eNodeB
EPC Evolved Packet Core
EPS Evolved Packet System
E-RAB E-UTRAN Radio Access Bearer
E-UTRAN Evolved Universal Terrestrial Radio Access Network
HeNB Home eNodeB
HeNB GW Home eNodeB Gateway
IE Information Element
LTE Long Term Evolution
M2M Machine to Machine
MME Mobility Management Entity
RAN Radio Access Network
RAT Radio Access Technology
RRH Remote Radio Head
RRU Remote Radio Unit
S1-AP S1 Application Protocol
SCTP Stream Control Transmission Protocol
S-GW Serving Gateway
TNL Transport Network Layer
UE User Equipment
WAN Wireless Access Network

The invention claimed is:

1. A method in a network node of a wireless communication network, the method comprising:
determining that a plurality of S1 Application Protocol (S1-AP) user equipment (UE) contexts maintained by the network node remain valid after a Stream Control Transmission Protocol (SCTP) failure;
generating an S1 Setup Request message comprising an indication that the plurality of UE contexts maintained by the network node remain valid; and
communicating the S1 Setup Request message to a mobility management entity (MME), the MME an SCTP peer of the network node.

2. The method of claim 1, further comprising receiving, from the MME, an S1 Setup Response message comprising an indication that a plurality of UE contexts maintained by the MME remain valid.

3. The method of claim 1, further comprising:
receiving, from the MME, an S1 Setup Response message comprising an indication that a plurality of UE contexts maintained by the MME are invalid; and
reinitializing the plurality of UE contexts maintained by the network node.

4. The method of claim 1, further comprising:
determining a UE context maintained by the network node is invalid after the SCTP failure;
generating an S1 Reset message comprising an indication of the invalid S1-AP UE context; and
communicating the S1 Reset message to the MME.

5. The method of claim 1, wherein the indication that the plurality of UE contexts maintained by the network node remain valid comprises a hash value identifying the plurality of UE contexts.

6. The method of claim 1, wherein the indication that the plurality of UE contexts maintained by the network node remain valid comprises one or more Hypertext Transfer Protocol (HTTP) entity tags (ETags).

7. A method in a mobility management entity (MME) of a wireless communication network, the method comprising:
receiving an S1 Setup Request message from a network node, the S1 Setup Request message comprising an indication that a plurality of S1 Application Protocol (S1-AP) user equipment (UE) contexts maintained by the network node remain valid after a Stream Control Transmission Protocol (SCTP) failure; and
determining whether a plurality of UE contexts maintained by the MME remain valid after a SCTP failure.

8. The method of claim 7, further comprising:
upon determining the plurality of UE contexts maintained by the MME remain valid after the SCTP failure, generating an S1 Setup Response message comprising an indication that the plurality of UE contexts maintained by the MME remain valid; and
communicating the S1 Setup Response message to the network node.

9. The method of claim 7, further comprising:
upon determining the plurality of UE contexts maintained by the MME are invalid after the SCTP failure, generating an S1 Setup Response message comprising an indication that the plurality of UE contexts maintained by the MME are invalid;
reinitializing the plurality of UE contexts maintained by the MME; and
communicating the S1 Setup Response message to the network node.

10. The method of claim 7, wherein the indication that the plurality of UE contexts maintained by the MME remain valid comprises a hash value identifying the plurality of UE contexts.

11. The method of claim 7, wherein the indication that the plurality of UE contexts maintained by MME remain valid comprises one or more Hypertext Transfer Protocol (HTTP) entity tags (ETags).

12. A network node comprising a processor operable to:
determine that a plurality of S1 Application Protocol (S1-AP) user equipment (UE) contexts maintained by the network node remain valid after a Stream Control Transmission Protocol (SCTP) failure;
generate an S1 Setup Request message comprising an indication that the plurality of UE contexts maintained by the network node remain valid; and
communicate the S1 Setup Request message to a mobility management entity (MME), the MME an SCTP peer of the network node.

13. The network node of claim 12, the processor further operable to receive, from the MME, an S1 Setup Response message comprising an indication that a plurality of UE contexts maintained by the MME remain valid.

14. The network node of claim 12, the processor further operable to:
receive, from the MME, an S1 Setup Response message comprising an indication that a plurality of UE contexts maintained by the MME are invalid; and
reinitialize the plurality of UE contexts maintained by the network node.

15. The network node of claim 12, the processor further operable to:
determine a UE context maintained by the network node is invalid after the SCTP failure;
generate an S1 Reset message comprising an indication of the invalid S1-AP UE context; and
communicate the S1 Reset message to the MME.

16. The network node of claim 12, wherein the indication that the plurality of UE contexts maintained by the network node remain valid comprises a hash value identifying the plurality of UE contexts.

17. The network node of claim 12, wherein the indication that the plurality of UE contexts maintained by the network node remain valid comprises one or more Hypertext Transfer Protocol (HTTP) entity tags (ETags).

18. A mobility management entity (MME) comprising a processor operable to:
receive an S1 Setup Request message from a network node, the S1 Setup Request message comprising an indication that a plurality of S1 Application Protocol (S1-AP) user equipment (UE) contexts maintained by the network node remain valid after a Stream Control Transmission Protocol (SCTP) failure; and
determine whether a plurality of UE contexts maintained by the MME remain valid after a SCTP failure.

19. The MME of claim 18, the processor further operable to:
upon determining the plurality of UE contexts maintained by the MME remain valid after the SCTP failure, generate an S1 Setup Response message comprising an indication that the plurality of UE contexts maintained by the MME remain valid; and
communicate the S1 Setup Response message to the network node.

20. The MME of claim 18, the processor further operable to:
upon determining the plurality of UE contexts maintained by the MME are invalid after the SCTP failure, generate an S1 Setup Response message comprising an indication that the plurality of UE contexts maintained by the MME are invalid;
reinitialize the plurality of UE contexts maintained by the MME; and
communicate the S1 Setup Response message to the network node.

21. The MME of claim 18, wherein the indication that the plurality of UE contexts maintained by the MME remain valid comprises a hash value identifying the plurality of UE contexts.

22. The MME of claim 18, wherein the indication that the plurality of UE contexts maintained by MME remain valid comprises one or more Hypertext Transfer Protocol (HTTP) entity tags (ETags).

* * * * *